United States Patent
Bojic et al.

[15] 3,645,628
[45] Feb. 29, 1972

[54] APPARATUS FOR DIRECT SPECTROMETRIC ANALYSIS OF MOLTEN SUBSTANCES

[72] Inventors: Milan Bojic, 87 bis, rue Georges Ducrocq, 57 Metz; Daniel Jorre, 58 bis, rue Ivan Tourgueniev, 78 Buogival, both of France

[22] Filed: Jan. 29, 1971

[21] Appl. No.: 110,998

[30] Foreign Application Priority Data

Feb. 5, 1970 France....................................7004032

[52] U.S. Cl..................................................356/86, 356/98
[51] Int. Cl........................................................G01j 3/30
[58] Field of Search............................................356/86, 98

[56] References Cited

FOREIGN PATENTS OR APPLICATIONS 1,066,039  9/1959  Germany..................................356/86

Primary Examiner—Ronald L. Wibert
Assistant Examiner—F. L. Evans
Attorney—Michael S. Striker

[57] ABSTRACT

Apparatus for direct spectrometric analysis of molten metals has a spectrometer connected with a light-conveying tube provided at its free end with a coupling for an expendable tubular extension which is immersible into a bath of molten metal. A main electrode in the extension is connected with a spark generator by way of the tube and the generator produces a spark between the electrode and the surface of molten metal in the extension when the distance between such surface and the electrode is within a desired range. The light which is produced in response to generation of the spark is conveyed by an optical system in the tube and is analyzed in the spectrometer. The distance between the electrode and the surface of molten metal in the extension can be regulated by changing the pressure of an inert gas which is circulated in the extension above the surface of molten metal to evacuate metallic vapors which develop in response to generation of the spark.

16 Claims, 4 Drawing Figures

PATENTED FEB 29 1972          3,645,628

INVENTORS:
MILAN BOJIC
DANIEL JORRO
By: [signature] Attorney

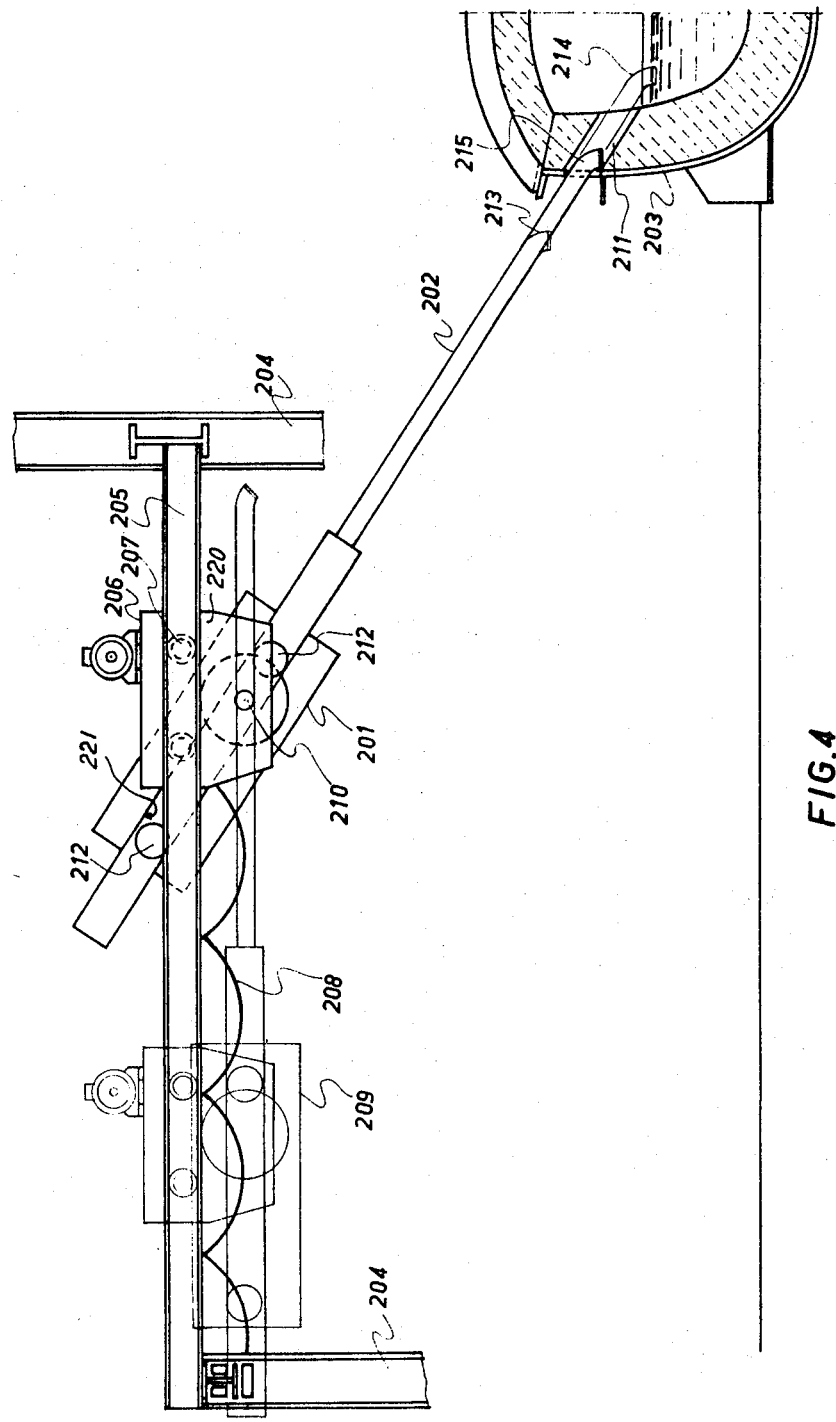

APPARATUS FOR DIRECT SPECTROMETRIC ANALYSIS OF MOLTEN SUBSTANCES

BACKGROUND OF THE INVENTION

The present invention relates to apparatus for spectral analysis of molten substances, and more particularly to improvements in apparatus for direct spectrometric analysis of molten metals, molten alloys or other materials which melt at elevated temperatures. The invention also relates to a method of regulating certain stages of operation of such apparatus.

It is well known to subject samples of various materials, particularly metals and their alloys, to a spectrometric analysis. It is also known to subject liquids, such as molten metals, to a direct spectrometric analysis. Thus, instead of withdrawing a sample of molten material and allowing the sample to set prior to analysis, the examination can take place by analyzing such material in a liquid state. This saves much time in connection with the analysis of samples of molten metals in refining furnaces. For example, the refining of steel in a converter proceeds at such a rapid rate that a delay of a few minutes for the purposes of an analysis can cause substantial losses in output. The losses in output are even more pronounced in connection with continuous refining of molten metallic materials. Furthermore, the composition of a bath of molten material is likely to change during the interval which elapses between the taking of a sample and the completion of a spectrometric analysis of such sample.

In spite of the obvious advisability of direct spectrometric analysis of molten materials, the presently known methods and apparatus for such analysis have met with little success, mainly because they do not embody any suitable means for insuring the generation of a satisfactory spark between an electrode and the surface of molten metal in order to produce a beam of light which can be subjected to direct spectrometric analysis. More particularly, the presently known apparatus for direct spectrometric analysis of molten materials do not solve the problem of maintaining the electrode at a desired distance from an exposed surface of molten material and of preventing metallic vapors from interfering with the transmission of light to the spectrometer.

SUMMARY OF THE INVENTION

An object of the invention is to provide a novel and improved apparatus which can be utilized for direct spectrometric analysis of molten iron, molten steel and/or other molten materials which melt at elevated temperatures.

Another object of the invention is to provide an apparatus wherein the analysis of molten material takes place and is completed with minimal delay following the generation of light which requires analysis and wherein the generation of a spark between a bath of molten material in an industrial furnace or vessel and an electrode can take place only when the distance between the electrode and the molten material is within an optimum range.

A further object of the invention is to provide an apparatus which is capable of automatically placing an electrode into an optimum position with reference to the surface of molten material in a furnace and of maintaining the electrode in such optimum position at least during the generation of light which is to be subjected to direct spectrometric analysis.

An additional object of the invention is to provide an apparatus wherein the positioning of the electrode, the generation of sparks, the analysis of light and the withdrawal of the electrode from an industrial furnace can be programmed to insure rapid completion of the analysis and rapid completion of all steps which must be carried out between successive analyses.

Still another object of the invention is to provide an apparatus which is equipped with means for preventing slag on the surface of molten metal from interfering with the spectrometric analysis.

Another object of the invention is to provide the apparatus with novel means for conveying light which develops in response to the generation of sparks between an electrode and the surface of molten material along a predetermined path to insure a reproducible analysis in a spectrometer and to avoid damage to optical elements which are employed to convey light along such path.

A further object of the invention is to provide a method of preparing the improved apparatus for carrying out a spectrometric analysis.

One feature of the present invention resides in the provision of a method of subjecting molten material to a direct spectrometric analysis, i.e., to an analysis which can be carried out without necessitating withdrawal of a sample of molten material from a bath in an industrial furnace. The method comprises the steps of placing an electrode above the surface of a bath of molten material, sealing the electrode and an adjacent portion of the surface of molten material from the surrounding atmosphere to thus provide a confining chamber which is bounded from below by the adjacent portion of the surface of molten material, introducing into the chamber an inert gas, regulating the pressure of gas in the chamber so as to maintain the surface of molten material at a selected distance from the electrode, connecting the molten material and the electrode to the poles of a source of electrical energy to produce a spark between the electrode and the molten material in the chamber with attendant generation of light, conveying the light in a predetermined direction, and subjecting the thus directed light to a spectrometric analysis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a similar schematic view of a third apparatus which is movable along an overhead support.

DESCRIPTION OF THE PREFERRED EMBODIMENTS

Figure 1:
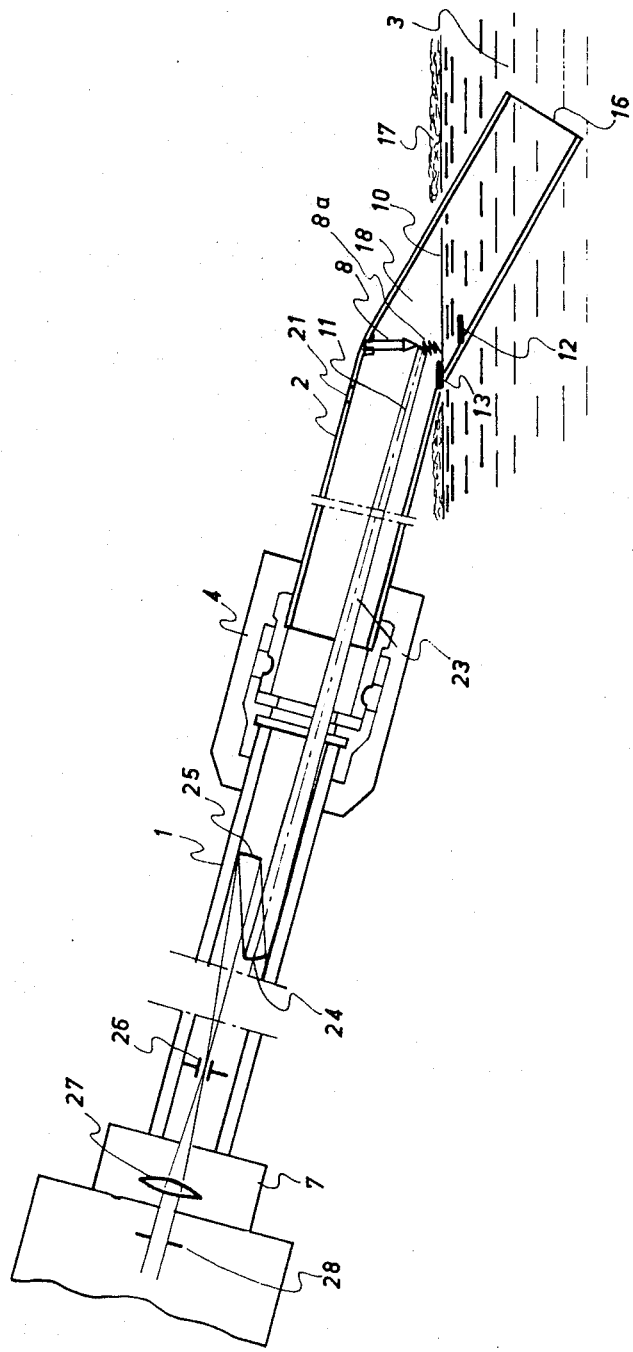
FIG. 1 is a fragmentary schematic longitudinal vertical sectional view of an apparatus which embodies one form of the invention.
Figure 2:
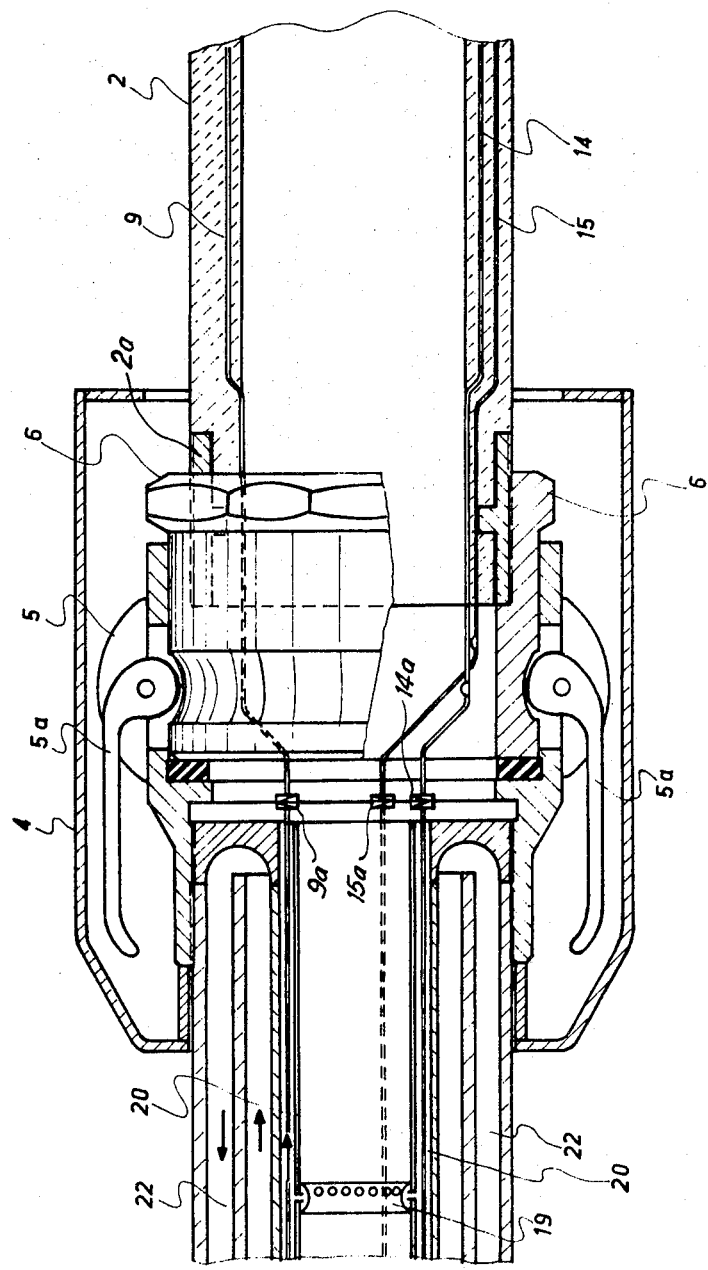
FIG. 2 is an enlarged sectional view of a detail in the structure shown in FIG. 1.

Referring first to FIG. 1, there is shown a portion of an apparatus for direct spectrometric analysis of molten substances, particularly molten iron or steel. The apparatus comprises an elongated tubular light-admitting member 1 (hereinafter called tube for short) which is separably coupled to an removable tubular extension 2 having two mutually inclined sections and preferably consisting of a refractory material which can stand the temperature of molten metallic material 3. The extension 2 is likely to be attacked and damaged on contact with molten material 3 and is therefore readily detachable from the tube 1 to be replaced with a fresh extension upon completion of a test. Replacement of the extension 2 upon completion of each analysis is particularly desirable if the material to be analyzed is molten iron or steel. The coupling 4 for the extension 2 is provided at the free end of the tube 1 and is designed to permit rapid attachment of a fresh extension 2 or rapid detachment of a damaged extension. As shown in FIG. 2, the coupling 4 includes an internally threaded sleeve 6 which is separably secured to the tube 1 by a locking mechanism 5 including several pawls 5a. The end portion of the extension 2 carries an externally threaded ring 2a which meshes with the sleeve 6.

That end of the tube 1 which is remote from the coupling 4 is connected with a spectrometer 7 serving as a means for analyzing the light produced by a spark 8a between a main electrode or counterelectrode 8 in the extension 2 and the upper surface 10 of the bath of molten material 3. The main electrode 8 normally consists of iron and is connected to a spark generator 114 (see FIG. 3) by way of a conductor 9 (see FIG. 2). FIG. 1 shows that the electrode 8 extends transversely of the extension 2 so that the spark 8a between its tip and the adjacent exposed surface 10 of molten material 3 is substantially normal to the optical axis 11 of the light-transmitting optical components in the tube 1. This insures satisfactory transmission of a beam 23 of light into the spectrometer 7.

The extension 2 is provided with two additional or auxiliary electrodes 12 and 13 which are mounted therein at different levels and extend substantially at right angles to the axis of the main electrode 8. The auxiliary electrodes 12, 13 preferably consist of cermet and are connected with the spark generator 114 by means of conductors 14, 15 (see FIG. 2).

The free end of the extension 2 is provided with a closure 16 which disintegrates upon immersion into the molten material 3. The purpose of the closure 16 is to prevent slag 17 which floats upon the molten material from entering the extension 2 during introduction of the extension into the interior of an industrial furnace. The layer of slag 17 is present on the surface of molten iron in a refining furnace. The closure 16 can constitute a plate consisting of soft iron but it is equally within the purview of our invention to employ a plug consisting of ligneous material or any other material (such as aluminum) which is destroyed on contact with the bath of molten material 3 so that molten material can penetrate into the front section of the extension 2. The closure 16 is destroyed immediately upon immersion into the molten material 3, i.e., this closure disintegrates as soon as the free end of the extension 2 reaches the position shown in FIG. 1. The material of the closure 16 melts, burns of evaporates at the temperature which prevails in the molten material 3 below the layer of slag 17. As the molten material 3 penetrates into the extension 2 (subsequent to disintegration of the closure 16), it reaches and rises above the lower auxiliary electrode 12. As soon as the inflowing molten material reaches the upper auxiliary electrode 13, it establishes a path for the flow of electric current between the auxiliary electrodes 12, 13 to initiate the generation of a spark 8a between the surface 10 and the tip of the main electrode 8. Thus, the auxiliary electrodes 12, 13 can be said to constitute the fixed contacts of a normally open switch which is closed by molten material 3 when such material reaches the electrode 13. The signal which is produced in response to closing of the switch including the auxiliary electrodes 12, 13 is preferably utilized to automatically terminate the penetration of extension 2 into the molten material 3 simultaneously with or immediately preceding the generation of a spark between the surface 10 and the tip of the main electrode 8. The tip of the electrode 8 is preferably located on or is immediately or closely adjacent to the optical axis 11 of optical elements in the tube 1.

The space 18 in the interior of the extension 2 above the exposed surface 10 constitutes a spark chamber which is preferably filled with an inert gas or with a mixture of two or more inert gases prior to generation of the spark 8a. The term "inert" is intended to denote those gases which do not react with molten material 3. Such gases are selected with a view not to interfere with the passage of light beam 23 from the spark 8a into the spectrometer 7.

As shown in FIG. 2, the tube 1 accommodates a ring-shaped nozzle 19 which serves to introduce an inert gas or a mixture of inert gases into the interior of the extension 2 so that such gases fill the spark chamber 18. The nozzle 19 receives inert gases from a supply conduit 20. The conductors 9, 14 and 15 pass through the supply conduit 20. The inert gases which are admitted by way of the conduit 20 and nozzle 19 serve the additional purpose of sweeping the spark chamber 18 so as to evacuate metallic vapors which develop in response to generation of the spark 8a. The vapors are thereby prevented from depositing and from forming layers of condensate on the optical elements 24, 25 in the interior of the tube 1. The inert gases are evacuated by way of an outlet 21 provided in the extension 2 at a level above the main electrode 8. A cooling jacket 22 surrounds the tube 1 and serves to circulate therein a suitable liquid or gaseous coolant.

The selection of inert gas which sweeps the spark chamber 18 depends on several factors, such as the nature of molten material 3, the wavelength of light which is to be analyzed by the spectrometer 7, and/or others. Good results were obtained with pure nitrogen, but it is equally possible to employ a mixture of nitrogen with argon or a mixture of nitrogen with helium. Such gases do not interfere with transmission of ultraviolet light which is analyzed in the spectrometer 7 when the molten material is a metal or alloy. Pure argon is not always suited for circulation in the chamber 18 because its ionization potential at elevated temperatures is relatively low. The pressure of inert gas in the spark chamber 18 also depends on operating conditions. Such pressure can fluctuate within a certain range to bring about slight fluctuations of the level of exposed surface 10 of molten material 3 in the extension 2. Such fluctuations should not exceed a certain amplitude at which the fluctuations would or could interfere with the analysis. Furthermore, the source of inert gas which admits such gas into the supply conduit 20 can be provided with suitable pressure-regulating means which is actuated to insure that the surface 10 in the interior of the extension 2 is maintained at a predetermined optimum level which is best suited for spectral analysis. Such regulation of pressure of inert gas can be resorted to in order to insure that the spark generator 114 will produce a spark 8a of desired length, i.e., that the spark will be generated at the exact moment when the distance between the surface 10 and the tip of the main electrode 8 is within a predetermined narrow range. By way of example, when the material 3 is molten iron or steel, the pressure of neutral gas or gases in the spark chamber 18 can be caused to fluctuate within a range of 9–99 grams per square centimeter.

The optical elements in the interior of the tube 1 serve to insure that the light beam 23 issuing from the spark 8a is properly directed into the spectrometer 7 without appreciable reduction of intensity and without other changes which could affect the accuracy of spectrometric analysis. Such optical elements are installed in the tube 1 between the coupling 4 and the spectrometer 7 and include two concave mirrors 24, 25. The light beam 23 which is produced on generation of a spark 8a travels in parallelism with and preferably close to the optical axis 11 and is reflected first by the mirror 24, thereupon by the mirror 25 and is focused in the plane of an aperture 26. The beam 23 passes through a condenser lens 27 and an aperture 28 of the spectrometer 7. The aperture 26 can constitute the sparking point of the spectrometer 7 for the analysis of solid samples.

The mirrors 24, 25 can be replaced by a different combination of light reflecting means, for example, by a concave mirror corresponding to the mirror 24 and a plane mirror replacing the concave mirror 25. The plane mirror then serves to erect the image of the spark 8a and to reflect such image through the aperture 26 along a predetermined path with reference to the optical axis 11. Proper guidance of the light beam into the aperture 28 is of importance in order to insure a reproducible spectrometric analysis of molten materials.

The mirrors 24, 25 can be further replaced by a system of lenses (not shown), especially if the apparatus 7 is to analyze light without the ultraviolet range of the spectrum. The mirrors are preferred for spectrometric analysis of the ultraviolet range, namely, when the molten material is a metal or an alloy. The mounting of the main electrode 8 in such position that it extends substantially transversely of the optical axis 11 insures that the electrode cannot interfere with the transmission of light into the spectrometer 7. Such mounting of the electrode 8 is made possible by employing an extension 2 which consists of two mutually inclined sections and by locating the electrode 8 in the space where the two sections meet. This also facilitates the introduction of the outer section into molten material 3 in such a way that the surface 10 is substantially normal to the longitudinal direction of the electrode 8.

Figure 3:
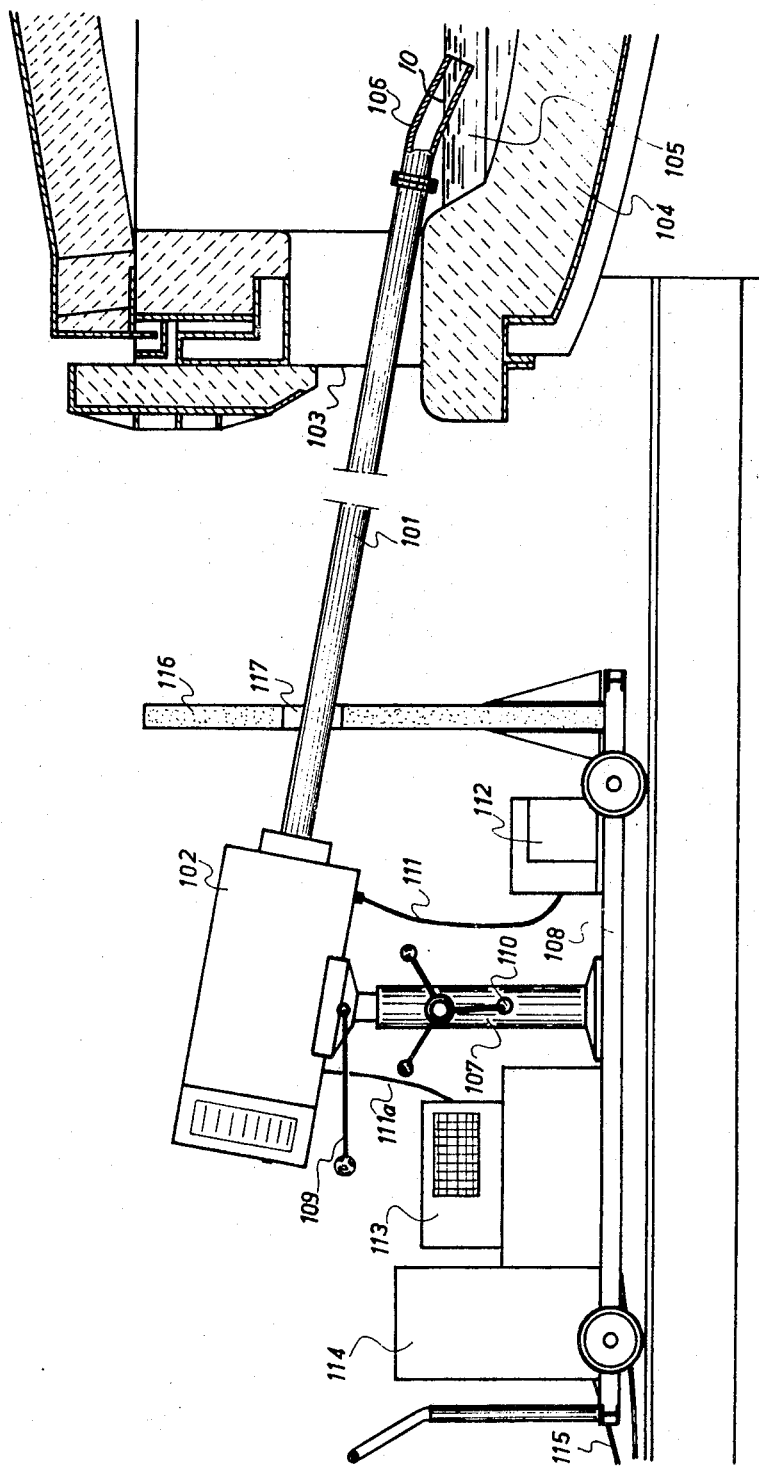
FIG. 3 is a schematic side elevational view of a second apparatus which is mounted on wheels and is shown in a position it assumes when the extension of its light conveying tube dips into a bath of molten metal in an industrial furnace.

As shown in FIG. 2, each of the conductors 9, 14, 15 has a first portion which extends from the spark generator 114 of FIG. 3, lengthwise of the tube 1 and to the coupling 4, and a second portion which is connected to the respective electrode (8, 12, 13) and extends lengthwise of the extension 2 to contact the corresponding first conductor portion in the region of the coupling 4. The terminals of the first and second portions of conductors 9, 14, 15 are respectively shown at 9a, 14a, 15a; such terminals engage each other when the extension 2 is properly coupled to the tube 1.

The rate of spark or arc discharge depends on the nature of analysis, as is well known from the spectrometric analysis of solid samples.

The useful life of the extension 2 depends on the resistance of its material, on the composition of the bath, and on the temperature of molten material. This extension can be replaced after each analysis or after several successive analyses. When the molten material is a metal or an alloy, the extension 2 is normally replaced after each immersion. If the extension normally remains immersed in molten material for repeated sampling, it is withdrawn from the bath only at such intervals as are required to connect the tube 1 with a fresh extension or to inspect the extension for the desirability of replacement.

If the electrode 12 and/or 13 is employed to initiate fluctuations in the pressure of inert gas which is admitted into the chamber 18 by way of the nozzle 19, the electrode 12 or 13 can cause the pressure of inert gas to increase to a predetermined higher pressure when the molten material rises to the level of such electrode and to decrease to a predetermined lower pressure as soon as it reaches such higher pressure. Thus, the molten material can be caused to rise and fall between two predetermined levels, and the spectrometer can make an analysis whenever the molten material reaches one such level. The two levels are preferably sufficiently close to each other to avoid excessive variations in the distance between the surface 10 and the tip of the electrode 8, i.e., such variations which would unduly affect the light beam passing into the opening 28 of the spectrometer 7 by way of the tube 1. The exact construction of the spectrometer 7 forms no part of the present invention.

FIG. 3 illustrates a mobile apparatus which embodies the features shown in FIGS. 1 and 2. The tube is shown at 101, an removable extension at 106, the bath of molten material at 105 and a compact spectrometer at 102. The molten material 105 is confined in an industrial furnace 104 having an opening 103 for introduction of the extension 106. The material 105 is assumed to be a molten metal or alloy. For example, the apparatus of FIG. 3 can employ a tube 101 having a length of about 3 meters.

The spectrometer 102 is mounted on an upright column or support 107 which is secured to the platform 108 of a wheel-mounted carriage or dolly. The arrangement is such that the spectrometer 102 is rotatable about the vertical axis of the support 107 (by way of a handle 109, and that the spectrometer is movable up or down by means of a suitable raising and lowering mechanism having a handwheel 110. Furthermore, the spectrometer 102 is turnable or pivotable about a horizontal axis defined by the shaft for the handle 109. The tube 101 (and hence the extension 106) shares all movements of the spectrometer 102.

It is clear that the handle 109 and the wheel 110 can be replaced by other adjusting means for changing the position of the spectrometer 102 with reference to the carriage. For example, the apparatus can include a control panel for switches, pushbuttons, knobs, levers or other suitable actuating means which serve to control one or more electric of fluid-operated motors which are mounted to move the spectrometer 102 up and down, about a vertical axis and/or about a horizontal axis to thus insure practically universal adjustability of the extension 106 with reference to the molten material 105.

A flexible hose 111 connects the spectrometer 102 with a vacuum pump 112. A second flexible hose 111a connects the spectrometer 102 with a control panel 113 for selection of the quantities of inert gases which are to be admitted into the spark chamber of the extension 106. A spark generator 114 which is mounted on the platform 108 is connected with an energy source by way of a cable 115 and to the electrodes in the extension 106 by way of the conductors 9, 14, 15 (not shown in FIG. 3). A protective shield 116 of heatresistant material is mounted on the platform 108 in front of the pump 112 and spectrometer 102 and is provided with a passage 117 for the tube 101. The dimensions of this passage are such that the tube 101 has sufficient freedom of movement up and down as well as sideways to place the extension 106 into an optimum position for introduction into the furnace 104.

The carriage including the platform 108 and the mechanisms which can adjust the spectrometer 102 constitute an adjustable immersing assembly which is preferably responsive to the signal produced by the electrodes 12, 13 (FIG. 1) when the surface 10 of molten material 3 or 105 rises to the level shown in FIG. 1 or 3. Such signal can be used to automatically terminate the penetration of extension 2 or 106 into the molten material 3 or 105 at the exact moment when the tip of the electrode 8 is located at an optimum distance from the surface 10. The adjustable immersing means can be manipulated (by moving the carriage 108, by actuating the handle 109 and/or by actuating the handwheel 110) to move the spectrometer 102, the tube 101 and the extension 106 as a unit to thereby introduce the extension into or to withdraw it from the bath of molten material 105 in the furnace 104. The electrodes 12, 13 of FIG. 1 can serve as a means to terminate the immersion of the extension 106 into molten material 105 when such material rises in the extension 106 to a desired optimum level at which the exposed surface of molten material is located at a desired distance from the tip of the main electrode 8. Also, the electrodes 12, 13 can serve as a means for operating (or for initiating the operation of) the spark generator 114 when the material 105 rises in the extension 106 to such desired optimum level. Still further, the signal produced by the electrodes 12, 13 of FIG. 1 can initiate automatic operation of the spectrometer 102 to carry out an analysis of the light which is produced by the spark between the molten material 105 and the main electrode in the extension 106 and is conveyed to the spectrometer 102 by way of the tube 101.

The control panel 113 is provided with means for regulating the pressure of inert gas in the spark chamber of the extension 106 to thereby change or determine the level of molten material 105 in the extension. The electrodes 12, 13 of FIG. 1 can form part of such pressure-regulating means by producing a signal which causes a pressure gauge to select a predetermined gas pressure as soon as the molten material rises to the level of the electrode 13 and prior to generation of a spark.

FIG. 4 illustrates a modified apparatus which resembles a trolley by being movable along an elongated horizontal guide rail 205 so as to introduce the extension 215 at the outer end of the tube 202 through the inlet opening 211 of an electric arc furnace 203 so that the free end of the extension 215 can dip into the bath of molten material. The spectrometer 201 supports the tube 202 and can move along the rail 205 which is mounted in a metallic frame 204. An electric motor 206 is provided to move the spectrometer 201 along the guide rail 205 as well as to cause the spectrometer to perform other movements which are needed to insure a preferably universal adjustability of the extension 215. The arrangement is preferably such that the motor 206 shares the movements of the spectrometer 201 along the guide rail 205; this motor can drive one or more rollers 207 which travel between two horizontal flanges of the rail 205. An electric cable 208 connects the spectrometer 201 with an energy source and with a spark generator. The cable 208 can embody electric conductors as well as one or more flexible hoses which connect the spectrometer 201 with the units numbered 112, 113 and shown in FIG. 3. The control panel 113 should be mounted in such a way that the operator can readily observe the gauges and other instrumentalities which indicate the results of analysis.

When the spectrometer 201 is not in use, it is held in a position of inclination as shown at 209. The tube 202 is then located in a substantially horizontal plane. In order to make a spectrometric analysis, the persons in charge start the motor 206 to move the spectrometer 201 toward the furnace 203 and the spectrometer is preferably pivoted during such movement about a horizontal axis so as to place the tube 202 into a requisite position of inclination for introduction of the extension 215 into the furnace. The spectrometer 201 is preferably mounted on a block or runner 220 so that it can pivot about the axis of a horizontal shaft 210. The pivotal movement of the spectrometer 201 about the axis of the shaft 210 can be brought about by a suitable transmission (not shown) which derives motion from the motor 206 or from a separate motor. The spectrometer 201 is further provided with rollers 212 which can travel in suitable ways 221 so as to move the tube 202 lengthwise toward or away from the furnace 203 and to thus cause the extension 215 to pass through the opening 211, either to introduce the tip of the extension into the bath of molten material or to withdraw the extension from the bath and thereupon from the furnace. All movements of the spectrometer 201 can be initiated by the motor 206 by way of electromagnetic clutches or the like which engage or disengage suitable transmissions. Additional adjusting means may be provided to move the guide rail 205 up and down along the frame 204 and/or sideways (i.e., at right angles to the plane of FIG. 4). It is further clear that the spectrometer 201 can be moved by resorting to two or more motors one of which moves the block 220 along the guide rail 205, another of which pivots the spectrometer about the axis of the shaft 210, a third of which moves the spectrometer 201 with reference to the block 220 in the longitudinal direction of the tube 202, and still another of which moves the rail 205 with reference to the frame 204.

The numeral 213 indicates the position of the extension 215 prior to introduction into the furnace, the numeral 214 denotes the position of the extension 215 during introduction into molten material in the furnace 203, and the numeral 215 indicates an intermediate position of the extension, for example, upon completion of the analysis and while the extension is being withdrawn from the furnace. In the position 213, the extension 215 is readily accessible for inspection and, if necessary, replacement with a fresh extension.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for direct spectrometric analysis of molten materials, particularly molten metals or alloys in industrial furnaces, comprising a spectrometer; an elongated light-admitting tubular member connected with said spectrometer at one end thereof; an elongated heat-resistant tubular extension having a first end and a second end, said second end of said extension being immersible into a bath of molten material so that the molten material rises in the extension to a predetermined level; coupling means separably securing the first end of said extension to the other end of said tubular member; a main electrode provided in said extension above said level; spark generator means operable to produce a spark between said electrode and the surface of molten material in said extension with attendant generation of light which is conveyed to said spectrometer for analysis by way of said tubular member; and electric conductor means having a first portion extending from said spark generator means and lengthwise of said tubular member to said coupling means, and a second portion connected with said electrode and extending along said extension to separably contact said first portion in the region of said coupling means.

2. Apparatus as defined in claim 1, wherein said extension defines a spark chamber which is bounded from below by molten material when the second end of the extension is immersed into such molten material, and further comprising optical light-transmitting means for directing light from the spark between said main electrode and molten material in said extension through said tubular member and into said spectrometer.

3. Apparatus as defined in claim 2, wherein said main electrode extends substantially transversely of said extension and has a free end spaced from said level, said optical light-transmitting means in said tubular member having an optical axis and said free end of said main electrode being adjacent to such axis.

4. Apparatus as defined in claim 1, wherein said extension comprises two mutually inclined sections one of which is separably connected with said tubular member by said coupling means and the other of which is immersible into molten material.

5. Apparatus as defined in claim 1, further comprising a closure for the second end of said extension, said closure consisting of a material which disintegrates on immersion into molten material but is sufficiently resistant to heat to seal said second end during penetration of the extension through a layer of slag or the like when such layer is present on the surface of molten material.

6. Apparatus as defined in claim 5, further comprising signal-generating means provided in said extension to produce a signal in response to penetration of molten material into said extension to said predetermined level.

7. Apparatus as defined in claim 6, wherein said signal-generating means comprises a plurality of auxiliary electrodes mounted in said extension below said level so that molten material which penetrates into the extension to said level establishes a current-conducting connection between said auxiliary electrodes.

8. Apparatus as defined in claim 7, further comprising immersing means for moving said extension into a bath of molten material, said immersing means being responsive to signals from said signal-generating means to terminate the movement of said extension into molten material.

9. Apparatus as defined in claim 1, further comprising means for circulating an inert gas in said extension above said predetermined level.

10. Apparatus as defined in claim 1, further comprising adjustable immersing means operative to move said spectrometer, said tubular member and said extension as a unit to thereby introduce the extension into and to withdraw the extension from a bath of molten material.

11. Apparatus as defined in claim 10, further comprising means for terminating the operation of said adjustable immersing means in response to penetration of molten material into the extension to said predetermined level.

12. Apparatus as defined in claim 10, further comprising means for operating said spark generator means in response to penetration of molten material into the extension to said predetermined level.

13. Apparatus as defined in claim 12, further comprising means for operating said spectrometer to carry out an analysis of light which is conveyed by said tubular member in response to operation of said spark generator means.

14. Apparatus as defined in claim 10, further comprising means for circulating an inert gas in said extension above said level and means for varying the pressure of such gas to thereby adjust said level.

15. Apparatus as defined in claim 14, wherein said means for varying the pressure of inert gas in said extension comprises auxiliary electrode means mounted in said extension.

16. A method of subjecting molten materials to a spectrometric analysis, comprising the steps of placing an electrode above the surface of a bath of molten material; sealing the electrode and the surface of molten material therebelow from the surrounding atmosphere to thus provide a confining chamber which is bounded from below by the surface of molten material; introducing into the chamber an inert gas; regulating the pressure of gas in said chamber so as to maintain the surface of molten material at a selected distance from the electrode; connecting the molten material and the electrode to the poles of a source of electrical energy to produce a spark between the electrode and the surface of molten material in said chamber with attendant generation of light; conveying the light in a predetermined direction; and subjecting such light to a spectrometric analysis.

* * * * *